United States Patent [19]

Pickens et al.

[11] Patent Number: 5,211,910

[45] Date of Patent: May 18, 1993

[54] ULTRA HIGH STRENGTH ALUMINUM-BASE ALLOYS

[75] Inventors: Joseph R. Pickens, Beltsville; Timothy J. Langan; Frank H. Heubaum, both of Baltimore; Lawrence S. Kramer, Baltimore, all of Md.; Alex Cho, Richmond, Va.

[73] Assignee: Martin Marietta Corporation, Bethesda, Md.

[21] Appl. No.: 471,299

[22] Filed: Jan. 26, 1990

[51] Int. Cl.$^5$ ............................................. C22C 21/06
[52] U.S. Cl. .................................... 420/532; 148/418; 148/439; 420/533; 420/539; 420/543; 420/545
[58] Field of Search .................... 148/11.5 A, 12.7 A, 148/159, 418, 439; 420/529, 532, 533, 545, 539, 543

[56] References Cited

U.S. PATENT DOCUMENTS

| | | | |
|---|---|---|---|
| 2,381,219 | 8/1945 | Le Baron | 75/139 |
| 2,915,391 | 12/1959 | Criner | 75/142 |
| 3,306,717 | 2/1967 | Lindstrand et al. | 420/534 |
| 3,346,370 | 10/1967 | Jagaciak et al. | 75/147 |
| 3,876,474 | 4/1975 | Watts et al. | 148/32 |
| 3,925,067 | 12/1975 | Sperry et al. | 75/142 |
| 4,526,630 | 7/1985 | Field | 148/159 |
| 4,584,173 | 4/1986 | Gray et al. | 420/533 |
| 4,588,553 | 5/1986 | Evans et al. | 420/533 |
| 4,603,029 | 7/1986 | Quist et al. | 420/535 |
| 4,624,717 | 11/1986 | Miller | 148/12.7 A |
| 4,626,409 | 12/1986 | Miller | 420/533 |
| 4,636,357 | 1/1987 | Peel et al. | 420/532 |
| 4,648,913 | 3/1987 | Hunt et al. | 148/12.7 A |
| 4,652,314 | 3/1987 | Meyer | 148/2 |
| 4,661,172 | 4/1987 | Skinner et al. | 148/12.7 A |
| 4,752,343 | 6/1988 | DuBost et al. | 148/12.7 A |
| 4,758,286 | 7/1988 | Dubost et al. | 148/12.7 A |
| 4,772,342 | 9/1988 | Polmear | 148/418 |
| 4,795,502 | 1/1989 | Cho | 148/2 |
| 4,806,174 | 2/1989 | Cho et al. | 148/12.7 A |
| 4,816,087 | 3/1989 | Cho | 148/2 |
| 4,832,910 | 5/1989 | Rioja et al. | 420/528 |
| 4,840,682 | 6/1989 | Curtis et al. | 148/12.7 A |
| 4,848,647 | 7/1989 | Gentry et al. | 228/263.17 |

FOREIGN PATENT DOCUMENTS 0149193 7/1985 European Pat. Off. .
158571 10/1985 European Pat. Off. .

(List continued on next page.)

OTHER PUBLICATIONS

"Registration Record of Aluminum Association Designations and Chemical Composition Limits for Wrought Aluminum and Wrought Aluminum Alloys", Revised Jan. 1989, the Aluminum Association, Inc., pp. 2-8.

(List continued on next page.)

Primary Examiner—R. Dean
Assistant Examiner—Robert R. Koehler
Attorney, Agent, or Firm—Gay Chin; Alan G. Towner

[57] ABSTRACT

Aluminum-base alloys containing Cu, Li, Zn, Mg and Ag are disclosed which possess highly desirable properties, such as relatively low density, high modulus, high strength/ductility combinations, strong natural aging response with and without prior cold work, and high artificially aged strength with and without prior cold work. In addition, the alloys possess good weldability, corrosion resistance, cryogenic properties, and elevated temperature properties. The alloys may comprise from about 1 to about 7 weight percent Cu, from about 0.1 to about 4 weight percent Li, from about 0.01 to about 4 weight percent Zn, from about 0.05 to about 3 weight percent Mg, from about 0.01 to about 2 weight percent Ag, from about 0.01 to about 2 weight percent grain refiner selected from Zr, Cr, Mn, Ti, Hf, V, Nb, B and TiB$_2$, and the balance Al along with incidental impurities. Preferred alloys comprise from about 3.0-6.5 weight percent Cu, from about 0.5-2.6 weight percent Li, from about 0.05-2 weight percent Zn, from about 0.1-1.5 weight percent Mg, from about 0.05-1 weight percent Ag, from about 0.05-0.5 weight percent grain refiner, and the balance Al and incidental impurities. Additional elements selected from Ge, Sn, Cd, In, Be, Sr, Sc, Y, and Ca may be used in addition to, or in place of, Zn in the present alloys.

81 Claims, 2 Drawing Sheets

FOREIGN PATENT DOCUMENTS

| | | |
|---|---|---|
| 188762 | 7/1986 | European Pat. Off. . |
| 227563 | 7/1987 | European Pat. Off. . |
| 238439 | 11/1985 | Japan . |
| 1133358 | 6/1986 | Japan . |
| 1231145 | 10/1986 | Japan . |
| 8703011 | 5/1987 | PCT Int'l Appl. . |
| 1172736 | 12/1969 | United Kingdom . |
| 2134925 | 8/1984 | United Kingdom . |

OTHER PUBLICATIONS

"Processing & Properties" 4th INTERNATIONAL ALUMINUM LITHIUM CONFERENCE, Champier, DuBost, Miannay, & Sabetay, eds, Proceedings of International Conf., 10–12 Jun. 1987, Paris, pp. 43–48.

"First Generation Products-2090", Bretz, ALITHALITE ALLOYS: 1987 UPDATE, Kar, Agrawal, & Quist, eds, Conference Proceedings of Int'l Aluminum-Lithium Symposium, Los Angeles, 25–26 Mar. 1987, pp. 1–40.

Chester & Polmear, "TEM Investigation of Precipitates in Al-Cu-Mg-Ag & Al-Cu-Mg Alloys", MICRON, 1980, vol. 11, pp. 311–312, Pergamon Press, Great Britain.

ALUMINUM ALLOYS: STRUCTURE & PROPERTIES, L. F. Mondolfo, Boston: Butterworths, 1976, pp. 502, 641, 693–729.

"Development of An Experimental Wrought Aluminum Alloy for Use at Elevated Temperatures", Polmear ALUMINUM ALLOYS: THEIR PHYSICAL AND MECHANICAL PROPERTIES, Starke & Sanders, ed., vol. I of Conference Proceedings, Charlottesville, Va., 15–20 Jun. 1986, pp. 661–674, Chameleon Press, London.

"Aging Phenomena of Al-Li-Mg Alloy Affected by Additional Elements", Hayashi et al. Journal of Japan Institute of Light Metals, vol. 32, #7, Jul. 1982 (translation).

ULTRA HIGH STRENGTH ALUMINUM-BASE ALLOYS

FIELD OF THE INVENTION

The present invention relates to aluminum-base alloys comprising copper, lithium, magnesium, silver, and at least one element selected from zinc, germanium, tin, cadmium, indium, beryllium, strontium and calcium, which alloys are characterized by a unique combination of mechanical and physical properties. Specifically, the alloys of the present invention possess extremely desirable properties, such as high artificially-aged strength with and without cold work, strong natural aging response with and without prior cold work, high strength/ductility combinations, low density, and high modulus. In addition, the alloys possess good corrosion resistance, weldability, cryogenic properties and elevated temperature properties. These alloys are particularly suited for aerospace, aircraft, armor, and armored vehicle applications where high specific strength (strength divided by density) is important and a good natural aging response is useful because of the impracticality in many cases of performing a full heat treatment. In addition, the weldability of the present alloys allows for their use in structures which are joined by welding.

BACKGROUND OF THE INVENTION

The desirable properties of aluminum and its alloys such as low cost, low density, corrosion resistance, and ease of fabrication are well known.

An important means for enhancing the strength of some aluminum alloys is heat treatment. Conventionally, three basic steps are employed in the heat treatment of aluminum alloys: (1) Solution heat treating; (2) Quenching; and (3) Aging. Additionally, a cold working step is often added prior to aging. Solution heat treating consists of soaking the alloy at a temperature sufficiently high and for a long enough time to achieve a nearly homogeneous solid solution of precipitate-forming elements in aluminum. The objective is to take into solid solution the maximum practical amounts of the soluble hardening elements. Quenching involves the rapid cooling of the solid solution, formed during the solution heat treatment, to produce a supersaturated solid solution at room temperature. The aging step involves the formation of strengthening precipitates from the rapidly cooled supersaturated solid solution. Precipitates may be formed using natural (ambient temperature), or artificial (elevated temperature) aging techniques. In natural aging, the quenched alloy is held at temperatures in the range of $-20°$ to $+50°$ C., typically at room temperature, for relatively long periods of time. For certain alloy compositions, the precipitation hardening that results from natural aging alone produces useful physical and mechanical properties. In artificial aging, the quenched alloy is held at temperatures typically in the range of $100°$ to $200°$ C. for periods of approximately 5 to 48 hours, typically, to effect precipitation hardening.

The extent to which the strength of Al alloys can be increased by heat treatment is related to the type and amount of alloying additions used. The addition of copper to aluminum alloys, up to a certain point, improves strength, and in some instances enhances weldability. The further addition of magnesium to Al-Cu alloys can improve resistance to corrosion, enhance natural aging response without prior cold work and increase strength. However, at relatively low Mg levels, i.e., 1.5 percent, weldability is decreased.

One commercially available aluminum alloy containing both copper and magnesium is Aluminum Association registered alloy 2024, having nominal composition Al—4.4 Cu—1.5 Mg—0.6 Mn. Alloy 2024 is a widely used alloy with high strength, good toughness, good warm temperature properties and a good natural-aging response. However, its corrosion resistance is limited in some tempers, it does not provide the ultra high strength and exceptionally strong natural-aging response achievable with the alloys of the present invention, and it is only marginally weldable. In fact, 2024 welded joints are not considered commercially useful in most situations.

Another commercial Al-Cu-Mg alloy is Aluminum Association registered alloy 2519 having a nominal composition of Al—5.6 Cu—0.2 Mg—0.3 Mn—0.2 Zr—0.06 Ti—0.05 V. This alloy was developed by Alcoa as an improvement on alloy 2219, which is presently used in various aerospace applications. While the addition of Mg to the Al-Cu system can enable a natural-aging response without prior cold work, alloy 2519 has only marginally improved strengths over alloy 2219 in the highest strength tempers.

Work reviewed by Mondolfo on conventional Al-Cu-Mg alloys indicates that the main hardening agents are $CuAl_2$ type precipitates in alloys in which the Cu to Mg ratio is greater than 8 (See ALUMINUM ALLOYS: STRUCTURE AND PROPERTIES, L. F. Mondolfo, Boston: Butterworths, 1976, p. 502).

Polmear, in U.S. Pat. No. 4,772,342, has added silver and magnesium to the Al-Cu system in order to increase elevated temperature properties. A preferred alloy has the composition Al—6.0 Cu—0.5 Mg—0.4 Ag—0.5 Mn—0.15 Zr—0.10 V—0.05 Si. Polmear associates the observed increase in strength with the "omega phase" that arises in the presence of Mg and Ag (see "Development of an Experimental Wrought Aluminum Alloy for Use at Elevated Temperatures," Polmear, ALUMINUM ALLOYS: THEIR PHYSICAL AND MECHANICAL PROPERTIES, E. A. Starke, Jr. and T. H. Sanders, Jr., editors, Volume I of Conference Proceedings of International Conference, University of Virginia, Charlottesville, Va., 15-20 Jun. 1986, pages 661–674, Chameleon Press, London).

Adding lithium to Al-Mg alloys and to Al-Cu alloys is known to lower the density and increase the elastic modulus, producing significant improvements in specific stiffness and enhancing the artificial age hardening response. However, conventional Al-Li alloys generally possess relatively low ductility at given strength levels and toughness is often lower than desired, thereby limiting their use.

Difficulties in melting and casting have limited the acceptance of Al-Li alloys. For example, because Li is extremely reactive, Al-Li melts can react with the refractory materials in furnace linings. Also, the atmosphere above the melt should be controlled to reduce oxidation problems. In addition, lithium lowers the thermal conductivity of aluminum, making it more difficult to remove heat from an ingot during direct-chill casting, thereby decreasing casting rates. Furthermore, in Al-Li melts containing 2.2 to 2.7 percent lithium, typical of recently commercialized Al-Li alloys, there is considerable risk of explosion. To date, the property benefits attributable to these new Al-Li alloys have not been sufficient to offset the increase in processing costs caused by the above-mentioned problems. As a consequence they have not been able to replace conventional alloys such as 2024 and 7075. The preferred alloys of the present invention do not create these melting and casting problems to as great a degree because of their lower Li content.

Al-Li alloys containing Mg are well known, but they typically suffer from low ductility and low toughness. One such system is the low density, weldable Soviet alloy 01420 as disclosed in British Patent 1,172,736, to Fridlyander et al, of nominal composition Al—5 Mg—2 Li. This alloy is reported to have medium to high strength, low density, and a modulus of elasticity higher than standard aluminum alloys.

A paper appearing in the Journal of Japan Institute of Light Metals lists Al-Li-Mg base alloys to which minor amounts of one of the elements Ag, Cu, or Zn has been added (see "Aging Phenomena of Al-Li-Mg Alloy Affected by Additional Elements," Hayashi et al, Journal of Japan Institute of Light Metals, Vol. 32, No. 7, July 1982). The authors studied the effect of each individual alloying element on the aging behavior of ternary Al-Li-Mg alloys. The authors did not combine Ag, Cu or Zn alloying additions, nor did they add grain refining elements to their alloys.

U.S. Pat. No. 3,346,370 to Jagaciak et al discloses Al-Mg base alloys to which minor amounts of Li in the range of 0.01–0.8 percent may be added. The alloys may also contain up to 0.72 percent Cu and up to 0.35 percent Zn.

Al-Li alloys containing Cu are also well known, such as alloy 2020, which was developed in the 1950's, but was withdrawn from production because of processing difficulties, low ductility and low fracture toughness. Alloy 2020 falls within the range disclosed in U.S. Pat. No. 2,381,219 to LeBaron, which teaches that the alloys are "magnesium-free", i.e., the alloys have less than 0.01 percent Mg, which is present only as an impurity. The alloys disclosed by LeBaron also require the presence of at least one element selected from Cd, Hg, Ag, Sn, In and Zn. The reference teaches that when zinc is used, levels below 0.5 percent are employed, with levels between 0.01 and 0.05 percent being preferred, due to the tendency for zinc to increase brittleness at higher levels.

To achieve the highest strengths in Al-Cu-Li alloys, it is necessary to introduce a cold working step prior to aging, typically involving stretching and/or rolling of the material at ambient or near ambient temperatures. The strain which is introduced as a result of cold working produces dislocations within the alloy which serve as nucleation sites for the strengthening precipitates. In particular, conventional Al-Cu-Li alloys must be cold worked before artificial aging in order to obtain high strengths, i.e., greater than 70 ksi ultimate tensile strength (UTS). Cold working of these alloys is necessary to promote high volume fractions of $Al_2CuLi$ ($T_1$) and $Al_2Cu$ (theta-prime) precipitates which, due to their high surface-to-volume ratio, nucleate far more readily on dislocations than in the aluminum solid solution matrix. Without the cold working step, the formation of the plate-like $Al_2CuLi$ and $Al_2Cu$ precipitates is retarded, resulting in significantly lower strengths. Moreover, the precipitates do not easily nucleate homogeneously because of the large energy barrier that has to be overcome due to their large surface area. Cold working is also useful, for the same reasons, to produce the highest strengths in many commercial Al-Cu alloys, such as 2219.

The requirement for cold working to produce the highest strengths in Al-Cu-Li alloys is particularly limiting in forgings, where it is often difficult to uniformly introduce cold work to the forged part after solutionizing and quenching. As a result, forged Al-Cu-Li alloys are typically limited to non-cold worked tempers, resulting in generally unsatisfactory mechanical properties.

Recently, Al-Li alloys containing both Cu and Mg have been commercialized. These include alloys 8090, 2091, 2090, and CP 276. Alloy 8090, which is described in U.S. Pat. No. 4,588,553 to Evans et al, contains 1.0–1.6 Cu, 2.2–2.7 Li, and 0.6–1.3 Mg. The alloy was designed with the following properties for aircraft applications: good exfoliation corrosion resistance, good damage tolerance, and a mechanical strength greater than or equal to 2024 in T3 and T4 conditions. Alloy 8090 does exhibit a natural-aging response without prior cold work, but not nearly as strong as that of the alloys of the present invention. In addition, 8090-T6 forgings have been found to possess low transverse elongation.

Alloy 2091, with 1.8–2.5 Cu, 1.7–2.3 Li, and 1.1–1.9 Mg, was designed as a high strength, high ductility alloy. However, at heat treated conditions that produce maximum strength, ductility is relatively low in the short transverse direction. Additionally, strengths achieved by alloy 2091 in non-cold worked tempers are significantly below those attained by the alloy in cold-worked tempers.

In recent work on alloys 8090 and 2091, Marchive and Charue have reported reasonably high longitudinal tensile strengths (see "Processing and Properties", 4TH INTERNATIONAL ALUMINUM LITHIUM CONFERENCE, G. Champier, B. Dubost, D. Miannay, and L. Sabetay editors, Proceedings of International Conference, 10–12 Jun. 1987, Paris, France, pp. 43–49). In the T6 temper, 8090 possesses a yield strength of 67.3 ksi and an ultimate tensile strength of 74 ksi, while 2091 possesses a yield strength of 63.8 ksi and an ultimate tensile strength of 75.4 ksi. However, the strengths of both 8090-T6 and 2091-T6 forgings are still below those obtained in the T8 temper, e.g. for 8090-T851 extrusions, tensile properties are 77.6 ksi YS and 84.1 ksi UTS, while for 2091-T851 extrusions, tensile properties are 73.3 ksi YS and 84.1 ksi UTS. By contrast, the alloys of the present invention possess highly improved properties compared to conventional 8090 and 2091 alloys in cold worked tempers, and possess even greater improvements in non-cold worked tempers.

Alloy 2090 comprises 2.4–3.0 Cu, 1.9–2.6 Li and 0–0.25 Mg. The alloy was designed as a low-density replacement for high strength alloys such as 2024 and 7075. However, it has weldment strengths that are lower than those of conventional weldable alloys such as 2219 which possesses typical weld strengths of 35–40 ksi. As cited in the following reference, in the T6 temper alloy 2090 cannot consistently meet the strength, toughness, and stress-corrosion cracking resistance of 7075-T73 (see "First Generation Products—2090," Bretz, ALITHALITE ALLOYS: 1987 UPDATE, J. Kar, S. P. Agrawal, W. E. Quist, editors, Conference Proceedings of International Aluminum-Lithium Symposium, Los Angeles, CA, 25–26 Mar. 1987, pages 1–40). As a consequence, the properties of current Al-Cu-Li alloy 2090 forgings are not sufficiently high to justify their use in place of existing 7xxx forging alloys.

It should be noted that the addition of Mg to the Al-Cu-Li system does not in its own right cause an increase in alloy strength in high strength tempers. For example 8090 (nominal composition Al—1.3 Cu—2.5 Li—0.7 Mg) does not significantly greater strength compared to nominally Mg-free alloy 2090 (nominal composition Al—2.7 Cu—2.2 Li—0.12 Zr). Furthermore, Mg-free alloy 2020 of nominal composition Al—4.5 Cu—1.1 Li—0.4 Mn—0.2 Cd is even stronger than Mg containing alloy 8090.

European Patent No. 158,571 to Dubost, assigned to Cegedur Societe de Transformation de l'Aluminum Pechiney, relates to Al alloys comprising 2.75-3.5 Cu, 1.9-2.7 Li, 0.1-0.8 Mg, balance Al and grain refiners. The alloys, which are commercially known as CP276, are said to possess high mechanical strength combined with a decrease in density of 6-9 percent compared with conventional 2xxx (Al-Cu) and 7xxx (Al-Zn-Mg) alloys. While Dubost lists high yield strengths of 498-591 MPa (72-85 ksi) for his alloys in the T6 condition, the elongations achieved are relatively low (2.5-5.5 percent).

U.S. Pat. No. 4,752,343 to Dubost et al, assigned to Cegedur Societe de Transformation de l'Aluminum Pechiney, relates to Al alloys comprising 1.5-3.4 Cu, 1.7-2.9 Li, 1.2-2.7 Mg, balance Al and grain refiners. The ratio of Mg to Cu must be between 0.5 and 0.8. The alloys are said to possess mechanical strength and ductility characteristics equivalent to conventional 2xxx to 7xxx alloys. While the purpose of Dubost et al is to produce alloys having mechanical strengths and ductilities comparable to conventional alloys, such as 2024 and 7075, the actual strength/ductility combinations achieved are below those attained by the alloys of the present invention.

U.S. Pat. No. 4,652,314 to Meyer, assigned to Cegedur Societe de Transformation de l'Aluminum Pechiney, is directed to a method of heat treating Al-Cu-Li-Mg alloys. The process is said to impart a high level of ductility and isotropy in the final product. The highest yield strength in the longitudinal direction achieved by Meyer is 504 MPa (73 ksi) for a cold worked, artificially aged alloy, which is significantly below the yield strengths attained in the alloys of the present invention in the cold worked, artificially aged condition.

U.S. Pat. No. 4,526,630 to Field, assigned to Alcan International Ltd., relates to a method of heat treating Al-Li alloys containing Cu and/or Mg. The process, which constitutes a modification of conventional homogenization techniques, involves heating an ingot to a temperature of at least 530° C. and maintaining the temperature until the solid intermetallic phases present within the alloy enter into solid solution. The ingot is then cooled to form a product which is suitable for further thermomechanical treatment, such as rolling, extrusion or forging. The process disclosed is said to eliminate undesirable phases from the ingot, such as the coarse copper-bearing phase present in prior art Al-Li-Cu-Mg alloys.

European Patent Application No. 227,563, to Meyer et al, assigned to Cegedur Societe de Transformation de l'Aluminum Pechiney, relates to a method of heat treating conventional Al-Li alloys to improve exfoliation corrosion resistance while maintaining high mechanical strength. The process involves the steps of homogenization, extrusion, solution heat treatment and cold working of an Al-Li alloy, followed by a final tempering step which is said to impart greater exfoliation corrosion resistance to the alloy, while maintaining high mechanical strength and good resistance to damage. Alloys subjected to the treatment have a sensitivity to the EXCO exfoliation test of less than or equal to EB (corresponding to good behavior in natural atmosphere) and a mechanical strength comparable with 2024 alloys. Meyer et al list broad ranges of alloying elements which, when combined with Al, can produce alloys that may be subjected to the final tempering treatment disclosed. The ranges listed include 1-4 Li, 0-5 Cu, and 0-7 Mg. While the reference lists very broad ranges of alloying elements, the actual alloys which Meyer et al utilize are the conventional alloys 8090, 2091, and CP 276. Thus, Meyer et al do not teach the formation of new alloy compositions, but merely teach a method of processing known Al-Li alloys. The highest yield strength achieved in accordance with the process of Meyer et al is 525 MPa (76 ksi) for alloy CP 276 ) 2.0 Li, 3.2 Cu, 0.3 Mg, 0.11 Zr, 0.04 Fe, 0.04 Si, balance Al) in the cold worked, artificially aged condition. In addition, the final tempering method of Meyer et al is said to improve exfoliation corrosion resistance in Al-Li alloys, whereby sensitivity to the EXCO exfoliation corrosion test is improved to a rating of less than or equal to EB. In contrast, the alloys of the present invention do not require a final tempering step in order to achieve a favorable level of exfoliation corrosion resistance.

U.K. Patent Application No. 2,134,925, assigned to Sumitomo Light Metal Industries Ltd., is directed to Al-Li alloys having high electrical resistivity. The alloys are suitable for use in structural applications, such as linear motor vehicles and nuclear fusion reactors, where large induced electrical currents are developed. The primary function of Li in the alloys of Sumimoto is to increase electrical resistivity. The reference lists broad ranges of alloying elements which, when combined with Al, may produce structural alloys having increased electrical resistivity. The disclosed ranges are 1.0-5.0 Li, one or more grain refiners selected from Ti, Cr, Zr, V and W, and the balance Al. The alloy may further include 0-5.0 Mn and/or 0.05-5.0 Cu and/or 0.05-8.0 Mg. Sumitomo discloses particular Al-Li-Cu and Al-Li-Mg based alloy compositions which are said to possess the improved electrical properties. Sumitomo also discloses one Al-Li-Cu-Mg alloy of the composition 2.7 Li, 2.4 Cu, 2.2 Mg, 0.1 Cr, 0.06 Ti, 0.14 Zr, balance aluminum, which possesses the desired increase in electrical resistivity. The strengths disclosed by Sumitomo are far below those achieved in the present invention. For example, in the Al-Li-Cu based alloys listed, Sumitomo gives tensile strengths of about 17-35 kg/mm$^2$ (24-50 ksi). In the Al-Li-Mg based alloys listed, Sumitomo discloses tensile strengths of about 43-52 kg/mm$^2$ (61-74 ksi).

U.S. Pat. No. 3,306,717 to Lindstrand et al relates to filler metal for welding Al-Zn-Mg base alloys. The filler metal comprises Al with 2-8 weight percent Mg, 0.1-10 weight percent Ag, and up to 8 weight percent Si. In addition, the filler metal may contain up to 1.0 weight percent each of Mn and Cr, up to 0.5 weight percent each of Cu, Ti and V, and up to 0.1 weight percent each of Li, Zr and B. The only example given by Lindstrand et al lists a filler metal composition of Al—5 Mg—0.9 Ag.

It should be noted that prior art Al-Cu-Li-Mg alloys have almost invariably limited the amount of Cu to 5 weight percent maximum due to the known detrimental effects of higher Cu content, such as increased density.

According to Mondolfo, amounts of Cu above 5 weight percent do not increase strength, tend to decrease fracture toughness, and reduce corrosion resistance (Mondolfo, pp. 706–707.) These effects are thought to arise because in Al-Cu engineering alloys, the practical solid solubility limit of Cu is approximately 5 weight percent, and hence any Cu present above about 5 weight percent forms the less desired primary theta-phase. Moreover, Mondolfo states that in the quaternary system Al-Cu-Li-Mg the Cu solubility is further reduced. He concludes, "The solid solubilities of Cu and Mg are reduced by Li, and the solid solubilities of Cu and Li are reduced by Mg, thus reducing the age hardening and the UTS obtainable." (Mondolfo, p.641). Thus, the additional Cu should not be taken into solid solution during solution heat treatment and cannot enhance precipitation strengthening, and the presence of the insoluble theta-phase lowers toughness and corrosion resistance.

One reference that teaches the use of greater than 5 percent Cu is U.S. Pat. No. 2,915,391 to Criner, assigned to Alcoa. The reference discloses Al-Cu-Mn base alloys containing Li, Mg, and Cd with up to 9 weight percent Cu. Criner teaches that Mn is essential for developing high strength at elevated temperatures and that Cd, in combination with Mg and Li, is essential for strengthening the Al-Cu-Mn system. Criner does not achieve properties comparable to those of the present invention, i.e., ultra high strength, strong natural aging response, high ductility at several technologically useful strength levels, weldability, resistance to stress corrosion cracking, etc.

The following references disclose additional Al, Cu, Li and Mg containing alloys: U.S. Pat. No. 4,603,029 to Quist et al; U.S. Pat. No. 4,661,172 to Skinner et al; European Patent Application Publication No. 0188762 to Hunt et al; European Patent Application Publication No. 0149193; Japanese Patent No. J6-0238439; Japanese Patent No. J6-1133358; and Japanese Patent No. J6-1231145. None of these references disclose the use of silver or zinc as alloying additions.

U.S. Pat. No. 4,584,173 to Gray et al relates to Al-Li-Mg base alloys containing minor amounts of Cu. The alloys comprise 2.1–2.9 percent Li, 3.0–5.5 percent Mg, and 0.2–0.7 percent Cu. In addition, Gray et al disclose that Zn may be added to these alloys in the range of 0–2.0 percent.

U.S. Pat. No. 4,758,286 to Dubost et al relates to aluminum-base alloys comprising 0.2–1.6 percent Cu, 1.8–3.5 percent Li, and 1.4–6.0 percent Mg. Dubost et al teach that up to 0.35 percent Zn may be included in the alloys. However, none of the Al-Cu-Li-Mg alloys actually produced by Dubost et al contain zinc.

U.S. Pat. No. 4,626,409 to Miller discloses aluminum-base alloys comprising 1.6–2.4 percent Cu, 2.3–2.9 percent Li, and 0.5–1.0 percent Mg. Miller teaches that up to 2.0 percent Zn may be added to these alloys, but none of the specific alloys produced by Miller contain zinc.

U.S. Pat. No. 4,648,913 to Hunt et al, assigned to Alcoa, the disclosure of which is hereby incorporated by reference, relates to a method of cold working Al-Li alloys wherein solution heat treated and quenched alloys are subjected to greater than 3 percent stretch at room temperature. The alloy is then artificially aged to produce a final alloy product. The cold work imparted by the process of Hunt et al is said to increase strength while causing little or no decrease in fracture toughness of the alloys. The particular alloys utilized by Hunt et al are chosen such that they are responsive to the cold working and aging treatment disclosed. That is, the alloys must exhibit improved strength with minimal loss in fracture toughness when subjected to the cold working treatment recited (greater than 3 percent stretch) in contrast to the result obtained with the same alloy if cold worked less than 3 percent. Hunt et al broadly recite ranges of alloying elements which, when combined with Al, may produce alloys that are responsive to greater than 3 percent stretch. The disclosed ranges are 0.5–4.0 Li, 0–5.0 Mg, up to 5.0 Cu, 0–1.0 Zr, 0–2.0 Mn, 0–7.0 Zn, balance Al. While Hunt et al disclose very broad ranges of several alloying elements, there is only a limited range of alloy compositions that would actually exhibit the required combination of improved strength and retained fracture toughness when subjected to greater than 3 percent stretch. In contrast, large amounts of stretch are not required in order to produce favorable properties in the alloys of the present invention. In addition, the yield strengths attained in the alloys of the present invention are substantially above those achieved in the alloy compositions of Hunt et al. Further, Hunt et al indicate that it is preferred in their process to artificially age the alloy after cold working, rather than to naturally age. In contrast, the alloys of the present invention exhibit an extremely strong natural aging response.

U.S. Pat. No. 4,795,502 to Cho, assigned to Alcoa, the disclosure of which is hereby incorporated by reference, is directed to a method of producing unrecrystallized wrought Al-Li sheet products having improved levels of strength and fracture toughness. In the process of Cho, a homogenized aluminum alloy ingot is hot rolled at least once, cold rolled, and subjected to a controlled reheat treatment. The reheated product is then solution heat treated, quenched, cold worked to induce the equivalent of greater than 3 percent stretch, and artificially aged to provide a substantially unrecrystallized sheet product having improved levels of strength and fracture toughness. The final product is characterized by a highly worked microstructure which lacks well-developed grains. The Cho reference appears to be a modification of the Hunt et al reference listed above, in that a controlled reheat treatment is added prior to solution heat treatment which prevents recrystallization in the final product formed. Cho broadly states that aluminum base alloys within the following compositional ranges are suitable for the recited process: 0.5–4.0 Li, 0–5.0 Mg, up to 5.0 Cu, 0–1.0 Zr, 0–2.0 Mn, and 0–7.0 Zn. As in the Hunt et al reference, the particular alloys utilized by Cho are apparently chosen such that they exhibit a combination of improved strength and fracture toughness when subjected to greater than 3 percent cold work. The alloys of Cho must further be susceptible to the reheat treatment recited. While Cho provides a process which is said to increase strength in known Al-Li alloys, such as 2091, the strengths attained are substantially below those achieved in the alloys of the present invention. Cho also indicates that artificial aging should be used in his process to obtain advantageous properties. In contrast, the alloys of the present invention do not require artificial aging. Rather, the present alloys exhibit an extremely strong natural aging response which permits their use in applications where artificial aging is impractical.

U S. Patent Application Serial No. 07/327,666 of Pickens et al, filed Mar. 23, 1989, which is a Continuation-In-Part of U.S. patent application Ser. No. 07/233,705 filed Aug. 18, 1988, and which is hereby incorporated by reference, discloses Al-Cu-Mg-Li alloys having compositions within the following ranges: 5-7 Cu, 0.1-2.5 Li, 0.05-4 Mg, 0.01-1.5 grain refiner selected from Zr, Cr, Mn, Ti, Hf, V, Nb, B and TiB$_2$, and the balance aluminum. U.S. patent application Ser. No. 07/327,666 also discloses Al-Cu-Mg-Li alloys of lower Cu content having compositions within the following ranges: 3.5-5 Cu, 0.8-1.8 Li, 0.25-1.0 Mg, 0.01-1.5 grain refiner selected from Zr, Cr, Mn, Ti, Hf, V, Nb, B and TiB$_2$, and the balance aluminum. The Ser. No. 07/327,666 application further teaches that ancillary elements such as Ge, Sn, Cd, In, Be, Sr, Ca and Zn may be added, singly or in combination, in amounts of from about 0.01 to about 1.5 weight percent.

U.S. patent application Ser. No. 07/327,927, of Pickens et al, filed Mar. 23, 1989, which is a continuation-in-part of U.S. patent application Ser. No. 07/083,333, filed Aug. 10, 1987, and which is hereby incorporated by reference, discloses an Al-Cu-Mg-Li-Ag alloy with compositions in the following broad range: 0-9.79 Cu, 0.05-4.1 Li, 0.01-9.8 Mg, 0.01-2.0 Ag, 0.05-1.0 grain refiner selected from Zr, Cr, Mn, Ti, B, V, Hf and TiB$_2$, and the balance Al. No disclosure is made in the Ser. No. 07/327,927 application of the addition of zinc, or any of the elements germanium, tin, cadmium, indium, beryllium, strontium, scandium, yttrium and calcium, to the Al-Cu-Mg-Li-Ag alloys. In accordance with the present invention, Zn additions may be used to reduce the levels of Ag present in the alloys taught in the Ser. No. 07/327,927 application. Thus, Zn may be substituted for a portion of the Ag, thereby reducing costs. Tensile properties are improved in the Zn containing alloys of the present invention. Additionally, resistance to stress corrosion cracking may also be improved.

SUMMARY OF THE INVENTION

An object of the present invention is to provide a novel aluminum-base alloy composition.

A further object of the present invention is to provide an aluminum-base alloy with outstanding naturally aged properties, both with (T3) and without (T4) cold work, including high ductility, weldability, excellent cryogenic properties, and good elevated temperature properties.

Another object of the present invention is to provide an aluminum-base alloy with substantially improved properties in the non-cold worked, artificially aged T6 temper, such as ultra high strength in combination with high ductility, weldability, excellent cryogenic properties, and good high temperature properties.

A further object of the present invention is to provide an aluminum-base alloy with outstanding T8 properties, such as ultra high strength in combination with high ductility, weldability, excellent cryogenic properties, good high temperature properties, and good resistance to stress-corrosion cracking.

Another object of the present invention is to provide an aluminum-base alloy comprising from about 1 to about 7 weight percent Cu, from about 0.1 to about 4 weight percent Li, from about 0.01 to about 4 weight percent total of at least one element selected from Zn, Ge, Sn, Cd, In, Be, Sr, Sc, Y, and Ca, from about 0.05 to about 3 weight percent Mg, from about 0.01 to about 2 weight percent Ag, from about 0.01 to about 2 weight percent grain refiner selected from Zr, Cr, Mn, Ti, Hf, V, Nb, B, TiB$_2$ and combinations thereof, and the balance aluminum and incidental impurities.

Another object of the present invention is to provide an aluminum-base alloy comprising from about 1 to about 7 weight percent Cu, from about 0.1 to about 4 weight percent Li, from about 0.01 to about 4 weight percent Zn, from about 0.05 to about 3 weight percent Mg, from about 0.01 to about 2 weight percent Ag, from about 0.01 to about 2 weight percent grain refiner selected from Zr, Cr, Mn, Ti, Hf, V, Nb, B, TiB$_2$ and combinations thereof, and the balance aluminum and incidental impurities.

It is a further object of the present invention to provide an aluminum-base alloy comprising Cu, Li, Mg, Ag, at least one element selected from Zn, Ge, Sn, Cd, In, Be, Sr, Sc, Y, and Ca, at least one grain refiner selected from Zr, Cr, Mn, Ti, Hf, V, Nb, B, and TiB$_2$, and the balance aluminum and incidental impurities, where the weight percent ratio of Cu to Li is relatively high, for example, greater than 2.5 or 3.0.

Unless stated otherwise, all compositions are in weight percent.

DETAILED DESCRIPTION OF THE INVENTION

The alloys of the present invention contain the elements Al, Cu, Li, Mg, Ag, at least one element selected from Zn, Ge, Sn, Cd, In, Be, Sr, Sc, Y, and Ca, and a grain refiner or combination of grain refiners selected from the group consisting of Zr, Ti, Cr, Mn, B, Nb, V, Hf and TiB$_2$. These elements are present within the following ranges: 1-7 Cu, 0.1-4 Li, 0.05-3 Mg, 0.01-2 Ag, 0.01-4 X, 0.01-2 grain refiner, with the balance Al and incidental impurities, where X represents Zn, Ge, Sn, Cd, In, Be, Sr, Sc, Y, Ca, or a combination thereof. Zinc is the most highly preferred alloying addition out of the above listed group of Zn, Ge, Sn, Cd, In, Be, Sr, Sc, Y, and Ca. Therefore, the present disclosure will focus mainly upon alloy compositions comprising the element Zn. However, it is to be understood that use of Ge, Sn, Cd, In, Be, Sr, Sc, Y, and Ca alloying additions is within the scope of the present invention, and that the partial or total substitution of Zn with one or more of these elements is contemplated. In accordance with the present invention, preferred ranges are from about 3.0 to about 6.5 Cu, from about 0.5 to about 2.6 Li, from about 0.05 to about 2 Zn, from about 0.1 to about 1.5 Mg, from about 0.05 to about 1 Ag, from about 0.05 to about 0.5 grain refiner(s), and the balance essentially Al. More preferred ranges are from about 3.5 to about 5.5 Cu, from about 0.8 to about 2.0 Li, from about 0.2 to about 1.5 Zn, from about 0.2 to about 0.8 Mg, from about 0.1 to about 0.5 Ag, from about 0.08 to about 0.2 grain refiner(s), and the balance essentially Al. Most preferred ranges are from about 4.0 to about 5.0 Cu, from about 1.0 to about 1.6 Li, from about 0.25 to about 0.75 Zn, from about 0.3 to about 0.5 Mg, from about 0.1 to about 0.4 Ag, from about 0.08 to about 0.2 grain refiner(s), and the balance essentially Al. Preferred grain refiners include Zr and Ti, with the most preferred being Zr, since Zr may also serve as a potent recrystallization inhibitor. If Ge, Sn, Cd, In, Be, Sr, Sc, Y and Ca are used in place of, or in addition to, Zn, the total weight percentage of these elements falls within the above listed broad range of from about 0.01 to about 4 percent. When Zn is present in the preferred range of from about 0.05 to about 2 percent, the alloys of the present invention may further comprise a preferred range of from about 0.01 to about 1.5 percent of at least one of the elements Ge, Sn, Cd, In, Be, Sr, Sc, Y, and Ca. Table I lists compositional ranges for alloys of the present invention.

TABLE I

| | Compositional Ranges | | | | | |
|---|---|---|---|---|---|---|
| | Cu | Li | Zn | Mg | Ag | gr ref | Al |
| Broad | 1–7 | 0.1–4 | 0.01–4 | 0.05–3 | 0.01–2 | 0.01–2 | balance |
| Pref | 3.0–6.5 | 0.5–2.6 | 0.05–2 | 0.1–1.5 | 0.05–1 | 0.05–0.5 | balance |
| More Pref | 3.5–5.5 | 0.8–2.0 | 0.2–1.5 | 0.2–0.8 | 0.1–0.5 | 0.08–0.2 | balance |
| Most Pref | 4.0–5.0 | 1.0–1.6 | 0.25–0.75 | 0.3–0.5 | 0.1–0.4 | 0.08–0.2 | balance |

Incidental impurities associated with aluminum such as Si and Fe may be present, especially when the alloy has been cast, rolled, forged, extruded, pressed or otherwise worked and then heat treated.

In accordance with the present invention, the use of Cu in relatively high concentrations of about 1–7 percent, and preferably in amounts greater than about 3.0 percent, results in increased tensile and yield strengths over conventional Al-Li alloys. The use of greater than about 3.5 percent Cu is necessary to promote weldability of the alloys, with weldability being extremely good above about 4.5 percent Cu. Weldability is defined as the resistance to solidification hot-cracking. Cu concentrations above about 3.0 percent are also useful in order to provide sufficient amounts of Cu to form high volume fractions of $T_1$ ($Al_2CuLi$) strengthening precipitates in artificially aged tempers. These precipitates act to increase strength in the alloys of the present invention substantially above the strengths achieved in conventional Al-Li alloys. While Cu concentrations above about 3.0 percent are preferred, lower amounts of Cu down to about 1 percent may be used, for example, to decrease density. Additionally, while Cu concentrations of up to 7 percent are given in the broad compositional ranges of the present invention, it is possible to exceed this amount, although additional copper above 7 percent may result in decreased corrosion resistance and fracture toughness, while increasing density.

The use of Li in the alloys of the present invention permits a significant decrease in density over conventional Al alloys. Also, Li increases strength and improves elastic modulus. Advantageous physical and mechanical properties may be achieved with Li concentrations between about 0.1 and 4 percent. Below 0.1 percent, significant reductions in density are not realized, while above about 4 percent, the solubility limit of Li may be exceeded. Tensile strengths are maximized with Li levels between about 0.9 and 1.6 percent, with strengths decreasing below and above this range. Peak strengths fall within the range of about 1.1 to about 1.4 percent. For density limiting applications, higher levels of Li, i.e., 1.8 or 2.0 percent and higher, may be used to decrease density, although lower strengths may be realized at these higher levels.

High Cu to Li weight percent ratios may be utilized in the alloys of the present invention in order to provide improved properties. For example, Cu to Li weight percent ratios of greater than about 2.5 or 3.0 may be used in alloys containing greater than about 0.8 percent Li to produce high volume fractions of $T_1$ strengthening precipitates in the T8 temper.

The use of Zn in the alloys of the present invention increases tensile properties significantly. For example, strength and short transverse ductility are increased in some tempers. Also, the presence of Zn may enhance resistance to corrosion.

The use of Ge, Sn, Cd, In, Be, Sr, Sc, Y, and/or Ca may aid, for example, in the nucleation and refinement of precipitates.

The use of Mg in the alloys of the present invention enhances nucleation, thereby increasing strength. Also, Mg enhances natural aging response without prior cold work. Tensile strengths of the present alloys may vary depending upon Mg content. Favorable physical and mechanical properties are achieved with Mg concentrations between 0.05 and 3 percent, with peak strengths generally falling within the range of from about 0.2 to about 0.8 percent.

The use of Ag in the alloys of the present invention improves weldability and may increase strength to some degree. The highest strengths may be achieved in the present alloys with Ag concentrations of between about 0.1 and 0.4 percent.

In accordance with the present invention, several alloys were prepared having the following compositions, as set forth in Table II.

TABLE II

| | Nominal Compositions of Alloys (wt %) | | | | | | |
|---|---|---|---|---|---|---|---|
| Comp. | Cu | Li | Zn | Mg | Ag | Zr | Al |
| I | 4.75 | 1.3 | 0.25 | 0.4 | 0.4 | 0.14 | balance |
| II | 4.75 | 1.3 | 0.5 | 0.4 | 0.4 | 0.14 | balance |
| III | 4.75 | 1.3 | 0.75 | 0.4 | 0.4 | 0.14 | balance |
| IV | 4.75 | 1.3 | 1.0 | 0.4 | 0.4 | 0.14 | balance |
| V | 4.75 | 1.3 | 1.5 | 0.4 | 0.4 | 0.14 | balance |
| VI | 4.75 | 1.3 | 2.0 | 0.4 | 0.4 | 0.14 | balance |
| VII | 4.75 | 1.3 | 0.75 | 0.4 | 0.2 | 0.14 | balance |
| VIII | 4.75 | 1.3 | 0.75 | 0.4 | 0.1 | 0.14 | balance |
| IX | 4.0 | 1.5 | 0.5 | 0.4 | 0.4 | 0.14 | balance |
| X | 4.5 | 1.25 | 1.0 | 0.4 | 0.4 | 0.13 | balance |
| XI | 4.5 | 1.25 | 1.0 | 0.4 | 0.25 | 0.13 | balance |
| XII | 2.7 | 2.2 | 1.0 | 0.4 | 0.4 | 0.12 | balance |
| XIII | 2.7 | 2.2 | 1.0 | 0.4 | 0.25 | 0.12 | balance |
| XIV | 1.2 | 2.4 | 1.0 | 0.7 | 0.4 | 0.12 | balance |

Alloys I-IX listed above were cast and extruded using the following techniques. The elements were induction melted under an inert argon atmosphere and cast into 160 mm (6¼ in.) diameter, 23 kg (50 lb) billets. The billets were homogenized in order to affect compositional uniformity of the ingot using a two-stage homogenization treatment. In the first stage, the billets were heated for 16 hours at 454° C. (850° F.) to bring low melting temperature phases into solid solution, and in the second stage they were heated for 8 hours at 504° C. (940° F.). Stage I was carried out below the melting point of any nonequilibrium low-melting temperature phases that form in the as-cast structures, because melting of such phases can produce ingot porosity and/or poor workability. Stage II was carried out at the highest practical temperature without melting, to ensure rapid diffusion to homogenize the compositions. The billets were scalped and then extruded at a ram speed of 25 mm/s at approximately 370° C. (700° F.) to form rectangular bars having 10 mm by 102 mm (⅜ inch by 4 inch) cross sections. The alloys extruded extremely well with no cracking or surface tearing. The rectangular bar extrusions were subsequently solution heat treated at 504° C. (940° F.) for 1 hour and water quenched. Some segments of the extrusion were stretch straightened approximately 3 percent. This stretch straightening process straightens the extrusions and also introduces cold work. Some of the segments, both with and without cold work, were naturally aged at approximately 20° C. (68° F.). Other segments were artificially aged, at 160° C. (320° F.) if cold worked, or at 180° C. (356° F.) if not cold worked.

Alloys X-XIV listed above were cast and rolled using the following techniques. The elements were induction melted under an inert argon atmosphere and cast to form 30 pound ingots. The ingots were homogenized at 499° C. (930° F.) for 24 hours using a slow heat-up rate of 50° F. per hour. The homogenized ingots were scalped to approximately 3.25 inch by 5 inch cross section rolling stock and then hot rolled to nominal 0.5 inch thick gauge plate at a temperature range of 482° C. (900° F.) to 371° C. (700° F.). The rolled plates were solution heat treated at 504° C. (940 F) for 1 hour and cold water quenched. Some of the plates were stretched 3 percent and artificially aged at 160° C. (320° F.) for 24 hours to provide T8 temper plate. Other plates were artificially aged at 177° C. (350° F.) without stretch to provide T6 temper plate.

For ease of reference, the temper designations for the various combinations of aging treatment and presence or absence of cold work have been collected in Table III.

TABLE III

| Temper* | TEMPER DESIGNATIONS Description |
|---|---|
| T3 | solution heat treated cold worked** naturally aged to substantially stable condition |
| T4 | solution heat treated naturally aged to substantially stable condition |
| T6 | solution heat treated artificially aged |
| T8 | solution heat treated cold worked artificially aged |

*Where additional numbers appear after the standard temper designation, such as T81, this simply indicates a specific type of T8 temper, for example, at a certain aging temperature or for a certain amount of time.
**While a T4 or T6 temper may have cold work to effect geometric integrity, this cold work does not significantly influence the respective aged properties.

Table IV shows naturally aged tensile properties for Composition II alloy of the present invention. Unless stated otherwise, the tensile properties listed in the present disclosure are taken from the longitudinal direction (L). In some instances, properties in the long transverse direction (LT) are also given and are designated as such.

TABLE IV

| NATURALLY AGED TENSILE PROPERTIES | | | | | |
|---|---|---|---|---|---|
| Alloy Comp. | Temper | Orientation | YS (ksi) | UTS (ksi) | El. (%) |
| II | T3 | L | 57.6 | 77.4 | 17.0 |
| | T3 | LT | 52.3 | 72.5 | 19.8 |
| | T4 | L | 68.4 | 88.8 | 14.9 |
| | T4 | L | 67.4 | 90.1 | 17.0 |

As evidenced by the above listed properties, the Composition II alloy of the present invention exhibits phenomenal natural aging response. The tensile properties of Composition II in the naturally aged condition without prior cold work, T4 temper, are even superior to those of alloy 2219 in the artificially aged condition with prior cold work, i.e., in the fully heat treated condition or T81 temper. It is significant that this exceptional natural aging response exists without prior cold work, because it provides a vehicle for increasing the strength of weldments and forgings in which the induction of cold work is not practical. The handbook property minima for extrusions of 2219-T81, the current standard space alloy, are 44.0 ksi YS, 61.0 ksi UTS and 6 percent elongation. The T81 temper is the highest strength standard temper for 2219 extrusions of similar geometry to the Composition II alloy. Composition II in the naturally aged tempers also has advantageous properties over alloy 2024 in the high strength T81 temper, one of the leading aircraft alloys, which has 58 ksi YS, 66 ksi UTS and 5 percent elongation handbook minima. Alloy 2024 exhibits a natural aging response, i.e., T42, but it is far less than that of Composition II. The superior properties of Composition II over conventional alloys 2219 and 2024 are shown in Table V. It should be emphasized that the naturally aged (T3 and T4) conditions for Composition II are being compared to the optimum high strength T8 tempers for the conventional 2219 and 2024 alloys, as well as to the T4 temper for the alloy 2024.

TABLE V

| | | TENSILE PROPERTIES | | |
|---|---|---|---|---|
| Alloy | Temper | YS (ksi) | UTS (ksi) | El. (%) |
| Comp.II | T4 | 68.4 | 88.8 | 14.9 |
| | T4 | 67.4 | 90.1 | 17.0 |
| | T3 | 57.6 | 77.4 | 17.0 |
| 2219 | T81 minima | 44.0 | 61.0 | 6.0 |
| | T81 typicals | 51.0 | 66.0 | 10.0 |
| 2024 | T42 minima | 38.0 | 57.0 | 12.0 |
| | T81 minima | 58.0 | 66.0 | 5.0 |

Aging studies indicate that near-peak strengths can be obtained in technologically practical periods of time as follows: about 160° C. for stretched material, or about 180° C. for unstretched material. The lower temperature is selected for the stretched material because dislocations introduced by the cold work accelerate the aging kinetics. However, it is recognized that these temperatures may be varied.

In the artificially-aged condition, the alloys of the present invention attain ultra high strength. Of particular significance is the fact that peak tensile strengths (UTS) of well over 100 ksi with elongations of 5 percent may be obtained in both the T8 and T6 tempers. This indicates that cold work is not necessary to achieve ultra high strengths in the alloys of the present invention, as it typically is in conventional 2xxx alloys. In fact, Rockwell B hardness (a measure of alloy hardness that corresponds approximately one-to-one with UTS for these alloys) reaches substantially the same ultimate value for the present alloys irrespective of the amount of cold work (stretch) after sufficient aging time. This should provide considerable freedom in the manufacturing processes associated with aircraft and aerospace hardware. Additionally, elongations of up to 25 percent and higher are achieved in certain underaged, i.e., reverted, tempers. High ductility tempers such as this can be extremely useful in fabricating aerospace structural components because of the extensive cold-forming limits.

Table VI shows artificially aged tensile properties for various alloys of the present invention.

TABLE VI

| Alloy Comp. | Temper | Temper Description | Orientation | Aging Time (h) | Aging Temp. (°C.) | YS (ksi) | UTS (ksi) | El. (%) |
|---|---|---|---|---|---|---|---|---|
| II | T8 | reversion | L | 0.25 | 160 | 47.7 | 70.6 | 22.1 |
| | T8 | reversion | L | 0.5 | 160 | 49.0 | 73.2 | 20.1 |
| | T8 | under aged | L | 6 | 160 | 93.4 | 98.6 | 8.2 |
| | T8 | under aged | L | 6 | 160 | 91.6 | 98.4 | 8.1 |
| | T8 | under aged | L | 16 | 160 | 100.9 | 103.2 | 5.7 |
| | T8 | under aged | LT | 16 | 160 | 94.8 | 97.4 | 4.1 |
| | T8 | under aged | LT | 16 | 160 | 93.8 | 97.8 | 4.3 |
| | T8 | near peak | L | 18 | 160 | 104.3 | 107.1 | 6.0 |
| | T8 | near peak | L | 18 | 160 | 103.6 | 106.0 | 5.9 |
| | T8 | near peak | L | 20 | 160 | 102.9 | 105.5 | 5.4 |
| | T8 | near peak | L | 20 | 160 | 106.3 | 109.0 | 7.5 |
| | T8 | near peak | LT | 20 | 160 | 94.9 | 98.2 | 4.1 |
| | T8 | over aged | L | 22 | 160 | 100.0 | 103.6 | 5.7 |
| | T8 | over aged | L | 22 | 160 | 106.7 | 108.6 | 6.7 |
| | T8 | over aged | LT | 22 | 160 | 95.1 | 98.2 | 3.7 |
| | T8 | over aged | L | 24 | 160 | 104.0 | 106.9 | 5.7 |
| | T8 | over aged | L | 24 | 160 | 102.6 | 105.3 | 7.0 |
| II | T6 | reversion | L | 0.25 | 180 | 40.2 | 70.0 | 22.8 |
| | T6 | reversion | L | 0.5 | 180 | 39.3 | 69.4 | 25.3 |
| | T6 | under aged | L | 6 | 180 | 93.2 | 101.0 | 6.2 |
| | T6 | under aged | L | 6 | 180 | 89.5 | 97.5 | 7.8 |
| | T6 | under aged | L | 16 | 180 | 104.0 | 107.1 | 3.5 |
| | T6 | under aged | L | 16 | 180 | 102.6 | 106.1 | 4.5 |
| | T6 | under aged | LT | 16 | 180 | 95.4 | 98.1 | 2.0 |
| | T6 | under aged | LT | 16 | 180 | 95.0 | 97.9 | 2.6 |
| | T6 | near peak | L | 20 | 180 | 106.0 | 110.0 | 2.8 |
| | T6 | near peak | L | 20 | 180 | 107.8 | 110.0 | 2.9 |
| | T6 | over aged | L | 32 | 180 | 103.8 | 106.5 | 1.7 |
| | T6 | over aged | L | 32 | 180 | 104.0 | 106.8 | 2.6 |
| X | T8 | under aged | L | 8 | 160 | 89.0 | 93.7 | 6.0 |
| | T8 | near peak | L | 24 | 160 | 91.0 | 95.3 | 4.0 |
| | T6 | under aged | L | 8 | 177 | 86.5 | 93.7 | 4.0 |
| | T6 | near peak | L | 24 | 177 | 96.7 | 97.0 | 2.5 |
| XI | T8 | near peak | L | 24 | 160 | 90.0 | 94.6 | 8.0 |
| | T6 | under aged | L | 8 | 177 | 72.5 | 82.5 | 6.0 |
| | T6 | near peak | L | 24 | 177 | 91.8 | 95.1 | 2.5 |

Figure 1:
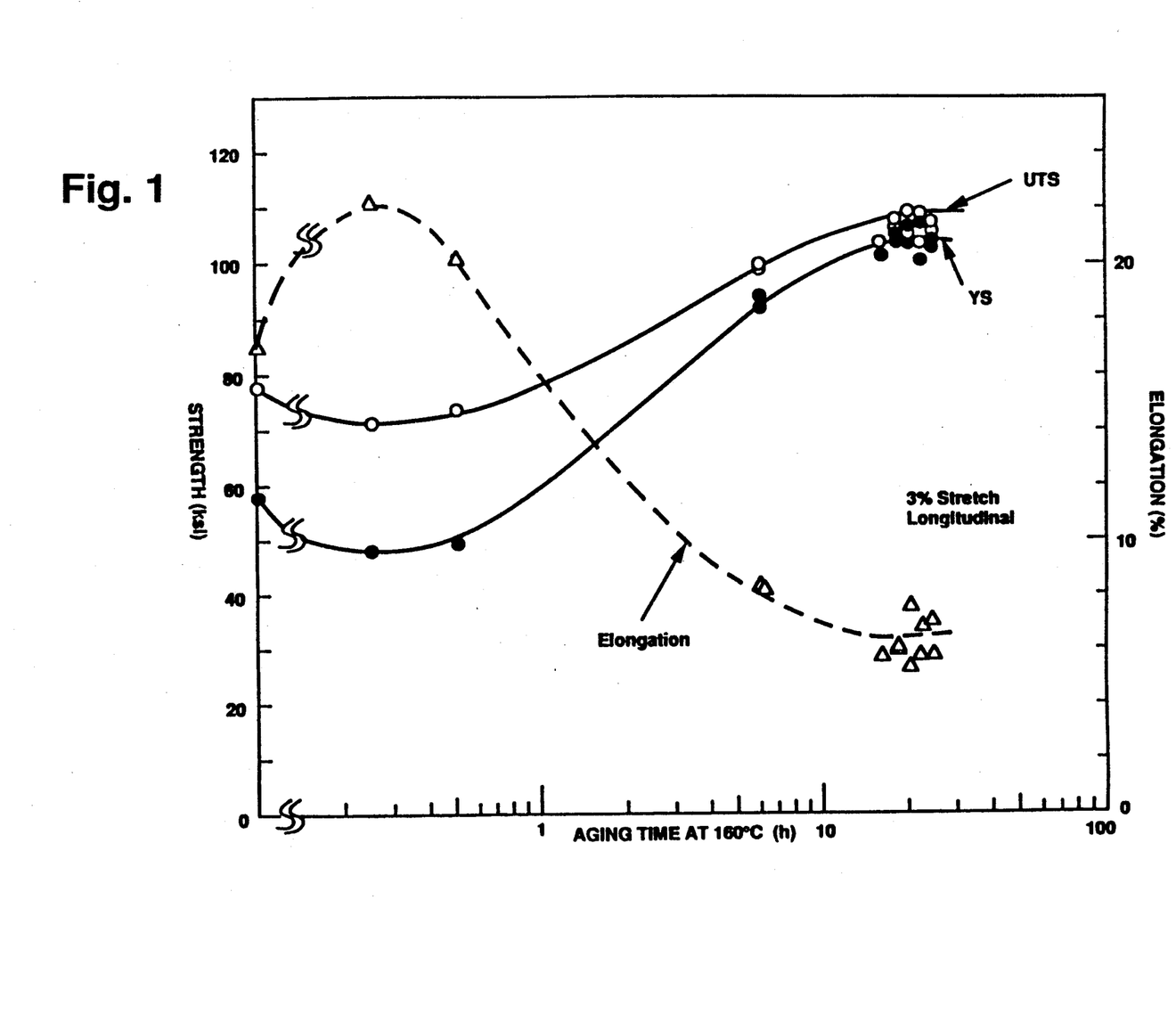
FIG. 1 is an aging curve showing strength and elongation vs. time for a cold worked alloy of the present invention. The alloy has a composition of 4.75 percent Cu, 1.3 percent Li, 0.5 percent Zn, 0.4 percent Mg, 0.4 percent Ag, 0.14 percent Zr, and the balance aluminum.
Figure 2:
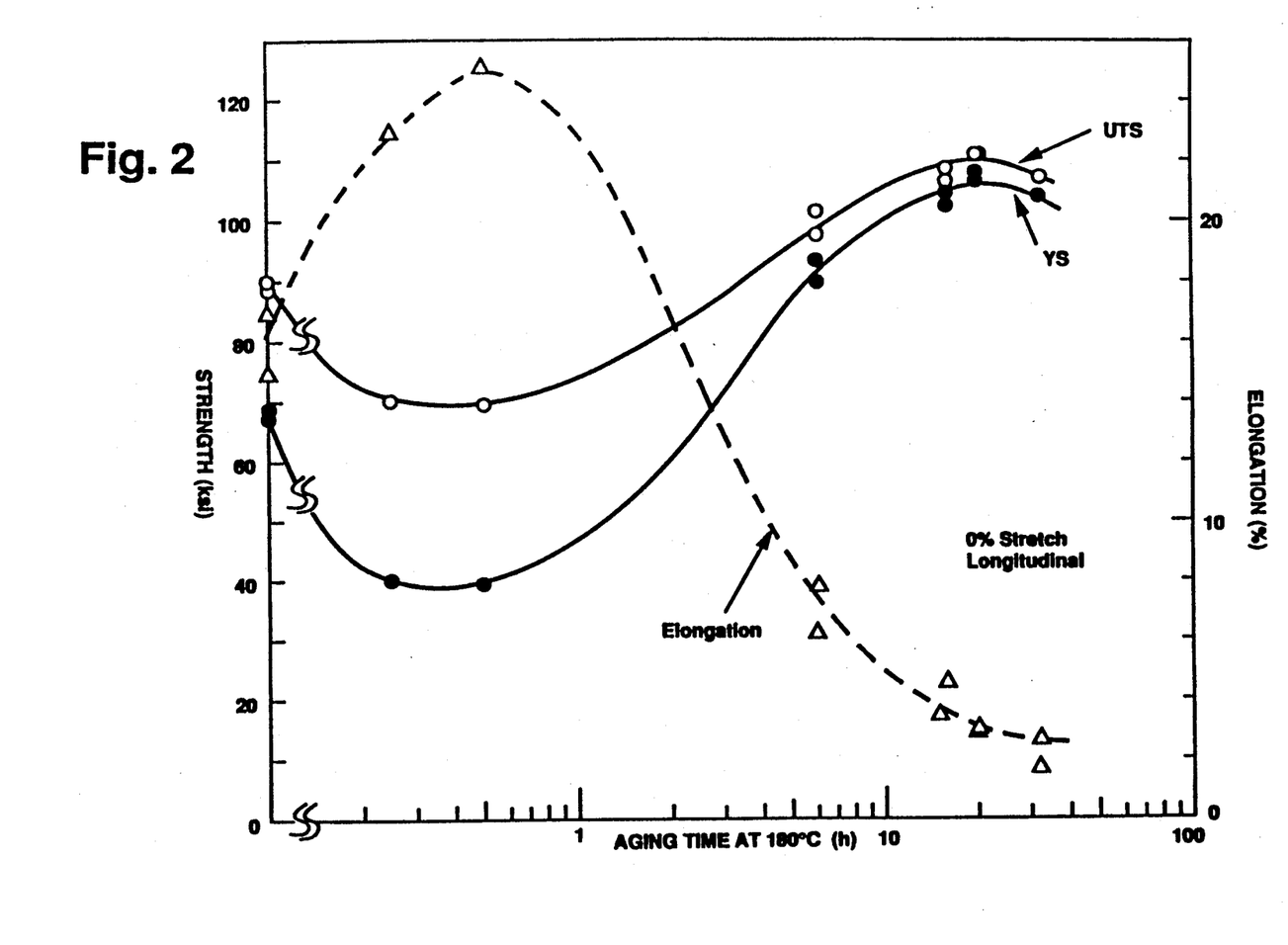
FIG. 2 is an aging curve showing strength and elongation vs. time for the same alloy in the non-cold worked condition.

FIG. 1 illustrates the aging response of Composition II alloy in the cold worked condition. Ultimate tensile strength, yield strength, and elongation are plotted versus aging time at 160° C. The values at the far left hand of the graph, i.e., at time=0, represent naturally aged (T3) properties. FIG. 2 illustrates the aging response of Composition II alloy in the non-cold worked condition. Ultimate tensile strength, yield strength, and elongation are plotted versus aging time at 180° C. Naturally aged (T4) properties are shown at the left hand side of the graph.

In general, alloys produced in accordance with the present invention having compositions in the range of from about 4.0 to about 5.5 Cu, from about 0.9 to about 1.6 Li, from about 0.2 to about 1 Zn, from about 0.2 to about 0.5 Mg, from about 0.1 to about 0.5 Ag, from about 0.05 to about 0.5 grain refiner, and the balance Al, possess extremely useful longitudinal strengths and elongations. For example, in the T3 temper, alloys within the above mentioned compositional ranges may display a longitudinal YS range of from about 50 to about 75 ksi, a longitudinal UTS range of from about 65 to about 88 ksi, and a longitudinal elongation range of from about 8 to about 25 percent. In the T4 temper, alloys within this compositional range may display a longitudinal YS range of from about 55 to about 77 ksi, a longitudinal UTS range of from about 67 to about 100 ksi, and a longitudinal elongation range of from about 8 to about 25 percent. Additionally, in the T6 temper, these alloys may display a longitudinal YS range of from about 70 to about 110 ksi, a longitudinal UTS range of from about 80 to about 118 ksi, and a longitudinal elongation range of from about 1 to about 10 percent. Further, in the T8 temper, alloys within the above-noted compositional range may display a YS range of from about 70 to about 110 ksi, a UTS range of from about 80 to about 118 ksi, and an elongation range of from about 2 to about 15 percent. It is noted that the properties listed above in the naturally aged tempers (T3 and T4) are for technologically practical aging times, i.e., 600 to 1200 hours, and that strengths will increase indefinitely with long term natural aging. Also, it may be possible to increase the yield strengths and ultimate tensile strengths listed above in the cold worked tempers (T3 and T8) by working at high reduction ratios, i.e., high extrusion ratios.

The alloys of the present invention may be readily produced by commercial scale production techniques. To illustrate, a 10,000 pound ingot was cast and rolled using the following procedures. An aluminum alloy consisting of 4.3 weight percent Cu, 1.21 weight percent Li, 0.56 weight percent Zn, 0.37 weight percent Mg, 0.37 weight percent Ag, and 0.14 weight percent Zr, the balance being essentially aluminum and impurities was cast into an approximately 10,000 pound ingot having a 12 inch thick by 45 inch wide cross section. The ingot was homogenized in a furnace at a temperature of 471° C. (880° F.) for 8 hours followed by a temperature of 499° C. (930° F.) for 36 hours and air cooled. The ingot was scalped and sawed to 10 inches thick, 40 inches wide, and 135 inches long. The ingot was then preheated in a furnace for 2 hours at 482° C. (900° F.) and hot rolled to 0.5 inch gauge plate. The plate was solution heat treated at 504° C. (940° F.) for 1.5 hours and immediately cold water quenched. The plate was then stretched 6 percent in the rolling direction at room temperature. Stretching was followed by artificial aging at 154° C. (310° F.) for times of 4 hours and 8 hours. Tensile test results and fracture toughness test results by compact tension specimens are listed in Table VII. The mechanical property values given are the averaged values from duplicates.

TABLE VII

| Aging Time (h) | Orientation | YS (ksi) | UTS (ksi) | El. (%) | Kr(max)* (ksi-v inch) |
|---|---|---|---|---|---|
| 4 | L | 81.8 | 86.7 | 12.2 | — |
|   | LT | 78.0 | 85.4 | 11.4 | 59.2 |
| 8 | L | 89.4 | 92.5 | 9.3 | — |
|   | LT | 85.5 | 90.9 | 7.8 | 32.1 |

*W-6 Compact Tension specimens were used.

It is noted that while certain processing steps are disclosed for the production of the alloy products of the present invention, these steps may be modified in order to achieve various desired results. For example, artificial aging times and/or temperatures may be varied, homogenization times and/or temperatures may be altered, and the amount of cold work employed may be varied. Thus, the steps including casting, homogenizing, working, heat treating, and aging may be altered, or additional steps may be added, to affect, for example, the physical and mechanical properties of the final products formed. Characteristics such as the type, size and distribution of strengthening precipitates may thus be controlled to some degree depending upon processing techniques. Also, grain size, grain aspect ratio, and the amount of recrystallization of the final product may be controlled to some extent. Additionally, during production, aging temperatures and aging times may be altered to increase production rates. Therefore, in addition to the processing techniques taught in the present specification, various modifications may be used in the production of the alloys of the present invention.

While the formation of ingots or billets of the present alloys by casting techniques is preferred, the alloys may also be provided in billet form consolidated from fine particulate. The powder or particulate material can be produced by such processes as atomization, mechanical alloying and melt spinning. In such powder processing techniques, it may be possible to increase the level of grain refining and/or alloying elements present within the alloys. For example, levels of Zr may be increased to amounts of 2 or 3 weight percent, or greater.

In addition to conventional metal forming techniques such as extruding, forging, rolling, super plastic forming, and semi-solid forming, the alloys of the present invention may be subjected to rapid solidification techniques including spray forming, atomization, splat cooling, melt spinning, and the like. Suitable spray forming techniques include Osprey processing and liquid dynamic compaction.

The alloys of the present invention possess properties which make them extremely desirable for welding applications. Their ability to attain high strengths without the necessity of cold work provides advantages in welding operations where the use of cold work is often not practical. Also, the strong natural aging response of the present alloys permits their use in welding applications where artificial aging after the welding operation is not feasible. The present alloys are highly resistant to hot cracking that can occur during welding, and may be welded using both conventional fillers and parent metal fillers, or modifications thereof. To illustrate the weldability of the present alloys, a Composition II plate was welded with an aluminum-base filler wire having the following composition: 5.0 weight percent Cu, 1.3 weight percent Li, 0.4 weight percent Mg, 0.4 weight percent Ag, 0.14 weight percent Zr, 0.1 weight percent Ti, and the balance aluminum. A highly constrained one pass variable polarity plasma arc (VPPA) welding was performed at 160 A current and 20 V potential at a travel speed of 5.5 ipm and a wire feed of 50 ipm. The composition II alloy was readily welded with no evidence of hot-cracking despite the high restraint imposed.

Conventional welding techniques, such as VPPA, gas tungsten arc, gas metal arc, electron beam, friction, etc, are suitable for welding the alloys of the present invention.

The present alloys, particularly those containing above about 4 or 4.5 percent Cu, are suitable for use as welding filler alloys. Thus, the present alloys may be used as welding filler alloys for welding together aluminum-base alloys, including the alloys taught by the present invention, as well as conventional aluminum-base alloys. To illustrate the use of the present alloys as welding alloys, a welding test was performed using Composition II plate. The test, known as the circular patch test, involves making a circular weld on an alloy plate and measuring crack length in the weldment. This geometry purposely constrains the solidifying weld to a great degree, which may cause solidification hot-cracking. A 2 inch diameter circular autogenous weld was deposited (bead on plate) on a ⅜ inch thick plate of Composition II alloy. No cracks resulted, i.e., crack length=0, in the Composition II filler, indicating that the Composition II alloy is highly suitable as a welding alloy. In contrast, the same patch test performed using commercial alloys 2090 and 2091 yielded a crack length of 0.028 inch in a 2090 weldment, and a crack length of 0.64 inch in a 2091 weldment.

When the alloys of the present invention are utilized as welding filler alloys, compositions within the following ranges are suitable: from about 4.0 to about 6.5 weight percent Cu, from about 0.5 to about 2.6 weight percent Li, from about 0.05 to about 2 weight percent Zn, from about 0.05 to about 0.8 weight percent Mg, from about 0.05 to about 1 weight percent Ag, from about 0.01 to about 2 weight percent grain refiner selected from Zr, Cr, Mn, Ti, Hf, V, Nb, B, TiB$_2$ and combinations thereof, and the balance aluminum Preferred welding alloy compositions contain from about 4.5 to about 6 weight percent Cu, from about 0.8 to about 1.6 weight percent Li, from about 0.25 to about 0.75 weight percent Zn, from about 0.2 to about 0.5 weight percent Mg, from about 0.1 to about 0.4 weight percent Ag, from about 0.05 to about 0.5 weight percent grain refiner selected from Zr, Cr, Mn, Ti, Hf, V, Nb, B, TiB$_2$ and combinations thereof, and the balance aluminum. Zirconium is the most preferred grain refiner. Small amounts of additional elements selected from Ge, Sn, Cd, In, Be, Sr, Sc, Y, and Ca may also be added to the above listed welding alloy compositions, for example, to act as nucleation aids. These elements may be added in a total range of from about 0.01 to about 1.5 percent.

The alloys of the present invention possess excellent elevated temperature properties, retaining large portions of their strength and useful amounts of elongation at temperatures of 300° F. (149° C.) and above.

The alloys of the present invention also possess excellent cryogenic properties. Strengths at cryogenic temperatures are actually increased over the room temperature strengths of the present alloys. In addition, useful amounts of elongation are retained at cryogenic temperatures. Cryogenic temperatures include −320° F. (−196° C.) and −80° F. (−68° C.). The excellent cryogenic properties attained with the alloys of the present invention give important implications for space applications where cryogenic alloys are often necessary for fuel and oxidizer tankage.

High strength aluminum alloys typically have low resistance to various types of corrosion, particularly stress-corrosion cracking (SCC), which has limited the usefulness of many high-tech alloys. In contrast, the alloys of the present invention possess excellent resistance to stress corrosion cracking. In addition, the present alloys have only minimal susceptibility to exfoliation corrosion. To illustrate the high resistance to stress corrosion cracking that the present alloys possess, a corrosion study is performed on a Composition II alloy. Ten specimens of extruded Composition II alloy in the cold worked, artificially aged temper (5 specimens aged 6 hours at 160° C. and 5 specimens aged 16 hours at 160° C.), prepared in accordance with ASTM standard G49, are loaded at 70 ksi in the long transverse (LT) direction. The specimens are subjected to an alternate immersion test conforming to ASTM standard G44 which involves alternating 50 minute dry exposures with 10 minute wet exposures in a 3.5 percent NaCl solution. All specimens survive the standard 40-day test (ASTM standard G64), indicating an extremely strong resistance to stress corrosion cracking. This is significant because it demonstrates excellent SCC resistance at stress levels above the yield strengths of existing aerospace alloys such as 2024 and 2014.

Given the unexpectedly high properties of the alloys of the present invention, it may be desirable to make Zn and Ag additions, in amounts specified in Table I, to commercial alloys 2091 and CP 276. It is noted that Compositions XII and XIII of the present invention represent the addition of Zn, Ag and Mg to recently commercialized aluminum-lithium alloy 2090, and that Composition XIV represents the addition of Zn and Ag to commercial alloy 8090. In the same manner, Zn and Ag additions may be made to alloys 2091 and CP 276. Accordingly, such additions are considered to be within the scope of the present invention.

It is to be understood that the above description of the present invention is susceptible to various modifications, changes, and adaptations by those skilled in the art, and that the same are to be considered to be within the spirit and scope of the invention as set forth by the claims which follow.

We claim:

1. An aluminum-base alloy consisting essentially of from about 1 to about 7 weight percent Cu, from about 0.1 to about 4 weight percent Li, from about 0.5 to about 4 weight percent total of at least one element selected from the group consisting of Zn, Ge, Sn, Cd, In, Be, Sr, Sc, Y, and Ca, from about 0.05 to about 3 weight percent Mg, from about 0.01 to about 2 weight percent Ag, from about 0.01 to about 2 weight percent grain refiner selected from the group consisting of Zr, Cr, Mn, Ti, Hf, V, Nb, B, TiB$_2$ and combinations thereof, and the balance aluminum and incidental impurities.

2. An alloy according to claim 1, wherein the Cu comprises from about 3.0 to about 6.5 percent, the Li comprises from about 0.5 to about 2.6 percent, the total of the elements selected from Zn, Ge, Sn, Cd, In, Be, Sr, Sc, Y, and Ca comprises from about 0.5 to about 2 percent, the Mg comprises from about 0.1 to about 1.5 percent, the Ag comprises from about 0.05 to about 1 percent, and the grain refiner comprises from about 0.05 to about 0.5 percent.

3. An alloy according to claim 1, wherein the Cu comprises from about 3.5 to about 5.5 percent, the Li comprises from about 0.8 to about 2.0 percent, the total of the elements selected from Zn, Ge, Sn, Cd, In, Be, Sr, Sc, Y, and Ca comprises from about 0.5 to about 1.5 percent, the Mg comprises from about 0.2 to about 0.8 percent, the Ag comprises from about 0.1 to about 0.5 percent, and the grain refiner comprises from about 0.08 to about 0.2 percent.

4. An alloy according to claim 1, wherein the Cu comprises from about 4.0 to about 5.0 percent, the Li comprises from about 1.0 to about 1.6 percent, the total of the elements selected from Zn, Ge, Sn, Cd, In, Be, Sr, Sc, Y, and Ca comprises from about 0.5 to about 0.75 percent, the Mg comprises from about 0.3 to about 0.5 percent, the Ag comprises from about 0.1 to about 0.4 percent, and the grain refiner comprises from about 0.08 to about 0.2 percent.

5. An alloy according to claim 1, wherein the grain refiner comprises Zr, Ti, or a combination thereof.

6. An aluminum-base alloy consisting essentially of from about to about 7 weight percent Cu, from about 0.1 to about 4 weight percent Li, from about 0.5 to about 4 weight percent Zn, from about 0.05 to about 3 weight percent Mg, from about 0.01 to about 2 weight percent Ag, from about 0.01 to about 2 weight percent grain refiner selected from the group consisting of Zr, Cr, Mn, Ti, Hf, V, Nb, B, TiB$_2$ and combinations thereof, and the balance aluminum and incidental impurities.

7. An alloy according to claim 6, wherein the grain refiner comprises Zr.

8. An alloy according to claim 7, wherein the grain refiner further comprises Ti.

9. An alloy according to claim 6, wherein the grain refiner comprises from about 0.05 to about 0.5 weight percent.

10. An alloy according to claim 6, wherein the grain refiner comprises from about 0.08 to about 0.2 weight percent.

11. An alloy according to claim 6, wherein the Cu comprises from about 3.0 to about 6.5 weight percent.

12. An alloy according to claim 6, wherein the Cu comprises from about 3.5 to about 5.5 weight percent.

13. An alloy according to claim 6, wherein the Cu comprises from about 4.0 to about 5.0 weight percent.

14. An alloy according to claim 6, wherein the Li comprises from about 0.5 to about 2.6 weight percent.

15. An alloy according to claim 6, wherein the Li comprises from about 0.8 to about 2.0 weight percent.

16. An alloy according to claim 6, wherein the Li comprises from about 1.0 to about 1.6 weight percent.

17. An alloy according to claim 6, wherein the Zn comprises from about 0.5 to about 2 weight percent.

18. An alloy according to claim 6, wherein the Zn comprises from about 0.5 to about 1.5 weight percent.

19. An alloy according to claim 6, wherein the Zn comprises from about 0.5 to about 0.75 weight percent.

20. An alloy according to claim 6, wherein the Mg comprises from about 0.1 to about 1.5 weight percent.

21. An alloy according to claim 6, wherein the Mg comprises from about 0.2 to about 0.8 weight percent.

22. An alloy according to claim 6, wherein the Mg comprises from about 0.3 to about 0.5 weight percent.

23. An alloy according to claim 6, wherein the Ag comprises from about 0.05 to about 1 weight percent.

24. An alloy according to claim 6, wherein the Ag comprises from about 0.1 to about 0.5 weight percent.

25. An alloy according to claim 6, wherein the Ag comprises from about 0.1 to about 0.4 weight percent.

26. An alloy according to claim 6, wherein the alloy further consists of from about 0.01 to about 1.5 weight percent of an element selected from the group consisting of Ge, Sn, Cd, In, Be, Sr, Sc, Y, Ca, and combinations thereof.

27. An aluminum-base alloy consisting essentially of from about 3.0 to about 6.5 weight percent Cu, from about 0.5 to about 2.6 weight percent Li, from about 0.5 to about 2 weight percent Zn, from about 0.1 to about 1.5 weight percent Mg, from about 0.05 to about 1 weight percent Ag, from about 0.01 to about 2 weight percent grain refiner selected from the group consisting of Zr, Cr, Mn, Ti, Hf, V, Nb, B, TiB$_2$ and combinations thereof, and the balance aluminum and incidental impurities.

28. An alloy according to claim 27, wherein the grain refiner comprises Zr.

29. An alloy according to claim 28, wherein the grain refiner further comprises Ti.

30. An alloy according to claim 27, wherein the grain refiner comprises from about 0.05 to about 0.5 weight percent.

31. An alloy according to claim 27, wherein the grain refiner comprises from about 0.08 to about 0.2 weight percent.

32. An alloy according to claim 27, wherein the Cu comprises from about 3.5 to about 5.5 weight percent.

33. An alloy according to claim 27, wherein the Cu comprises from about 4.0 to about 5.0 weight percent.

34. An alloy according to claim 27, wherein the Li comprises from about 0.8 to about 2.0 weight percent.

35. An alloy according to claim 27, wherein the Li comprises from about 1.0 to about 1.6 weight percent.

36. An alloy according to claim 27, wherein the Zn comprises from about 0.5 to about 1.5 weight percent.

37. An alloy according to claim 27, wherein the Zn comprises from about 0.25 to about 0.5 weight percent.

38. An alloy according to claim 27, wherein the Mg comprises from about 0.2 to about 0.8 weight percent.

39. An alloy according to claim 27, wherein the Mg comprises from about 0.3 to about 0.5 weight percent.

40. An alloy according to claim 27, wherein the Ag comprises from about 0.1 to about 0.5 weight percent.

41. An alloy according to claim 27, wherein the Ag comprises from about 0.1 to about 0.4 weight percent.

42. An alloy according to claim 27, wherein the alloy further consists of from about 0.01 to about 1.5 weight percent of an element selected from the group consisting of Ge, Sn, Cd, In, Be, Sr, Sc, Y, Ca, and combinations thereof.

43. An aluminum-base alloy consisting essentially of from about 3.5 to about 5.5 weight percent Cu, from about 0.8 to about 2.0 weight percent Li, from about 0.5 to about 1.5 weight percent Zn, from about 0.2 to about 0.8 weight percent Mg, from about 0.1 to about 0.5 weight percent Ag, from about 0.01 to about 2 weight percent grain refiner selected from the group consisting of Zr, Cr, Mn, Ti, Hf, V, Nb, B, TiB$_2$ and combinations thereof, and the balance aluminum and incidental impurities.

44. An alloy according to claim 43, wherein the grain refiner comprises Zr.

45. An alloy according to claim 44, wherein the grain refiner further comprises Ti.

46. An alloy according to claim 43, wherein the grain refiner comprises from about 0.05 to about 0.5 weight percent.

47. An alloy according to claim 43, wherein the grain refiner comprises from about 0.08 to about 0.2 weight percent.

48. An alloy according to claim 43, wherein the Cu comprises from about 4.0 to about 5.0 weight percent.

49. An alloy according to claim 43, wherein the Li comprises from about 1.0 to about 1.6 weight percent.

50. An alloy according to claim 43, wherein the Zn comprises from about 0.5 to about 0.75 weight percent.

51. An alloy according to claim 43, wherein the Mg comprises from about 0.3 to about 0.5 weight percent.

52. An alloy according to claim 43, wherein the Ag comprises from about 0.1 to about 0.4 weight percent.

53. An alloy according to claim 43, wherein the alloy further consists of from about 0.01 to about 1.5 weight percent of an element selected from the group consisting of Ge, Sn, Cd, In, Be, Sr, Sc, Y, Ca, and combinations thereof.

54. An aluminum-base alloy consisting essentially of from about 4.0 to about 5.0 weight percent Cu, from about 1.0 to about 1.6 weight percent Li, from about 0.5 to about 0.75 weight percent Zn, from about 0.3 to about 0.5 weight percent Mg, from about 0.1 to about 0.4 weight percent Ag, from about 0.01 to about 2 weight percent grain refiner selected from the group consisting of Zr, Cr, Mn, Ti, Hf, V, Nb, B, TiB$_2$ and combinations thereof, and the balance aluminum and incidental impurities.

55. An alloy according to claim 54, wherein the grain refiner comprises Zr.

56. An alloy according to claim 55, wherein the grain refiner further comprises Ti.

57. An alloy according to claim 54, wherein the grain refiner comprises from about 0.05 to about 0.5 weight percent.

58. An alloy according to claim 54, wherein the grain refiner comprises from about 0.08 to about 0.2 weight percent.

59. An alloy according to claim 54, wherein the alloy further consists of from about 0.01 to about 1.5 weight percent of an element selected from the group consisting of Ge, Sn, Cd, In, Be, Sr, Sc, Y, Ca, and combinations thereof.

60. A cryogenic aluminum-base alloy consisting essentially of from about 3.0 to about 6.5 weight percent Cu, from about 0.5 to about 2.6 weight percent Li, from about 0.5 to about 2 weight percent Zn, from about 0.1 to about 1.5 weight percent Mg, from about 0.05 to about 1 weight percent Ag, from about 0.01 to about 2 weight percent grain refiner selected from the group consisting of Zr, Cr, Mn, Ti, Hf, V, Nb, B, $TiB_2$ and combinations thereof, and the balance aluminum and incidental impurities.

61. A cryogenic alloy according to claim 60, wherein the Cu comprises from about 4.0 to about 5.0 weight percent, the Li comprises from about 1.0 to about 1.6 weight percent, and the grain refiner comprises from about 0.08 to about 0.2 weight percent.

62. A cryogenic alloy according to claim 60, wherein the grain refiner comprises Zr.

63. A weldable aluminum-base alloy consisting essentially of from about 4.0 to about 6.5 weight percent Cu, from about 0.8 to about 2.0 weight percent Li, from about 0.5 to about 1.5 weight percent Zn, from about 0.2 to about 0.8 weight percent Mg, from about 0.1 to about 0.5 weight percent Ag, from about 0.01 to about 2 weight percent grain refiner selected from the group consisting of Zr, Cr, Mn, Ti, Hf, V, Nb, B, $TiB_2$ and combinations thereof, and the balance aluminum and incidental impurities.

64. A weldable alloy according to claim 63, wherein the Cu comprises from about 4.5 to about 5.5 weight percent, the Li comprises from about 1.0 to about 1.6 weight percent, the Zn comprises from about 0.5 to about 0.75 weight percent, the Mg comprises from about 0.3 to about 0.5 weight percent, the Ag comprises from about 0.1 to about 0.4 weight percent, and the grain refiner comprises from about 0.08 to about 0.2 weight percent.

65. A weldable alloy according to claim 64, wherein the grain refiner comprises Zr.

66. A cold worked, naturally aged aluminum-base alloy consisting essentially of from about 4.0 to about 5.5 weight percent Cu, from about 0.9 to about 1.6 weight percent Li, from about 0.5 to about 1 weight percent Zn, from about 0.2 to about 0.5 weight percent Mg, from about 0.1 to about 0.5 weight percent Ag, from about 0.05 to about 0.5 weight percent grain refiner selected from the group consisting of Zr, Cr, Mn, Ti, Hf, V, Nb, B, $TiB_2$, and mixtures thereof, and the balance aluminum and incidental impurities, which in the T3 temper possesses a yield strength in the range of from about 50 to about 75 ksi, an ultimate tensile strength in the range of from about 65 to about 88 ksi, and an elongation in the range of from about 8 to about 25 percent.

67. A non-cold worked, naturally aged aluminum-base alloy consisting essentially of from about 4.0 to about 5.5 weight percent Cu, from about 0.9 to about 1.6 weight percent Li, from about 0.5 to about 1 weight percent Zn, from about 0.2 to about 0.5 weight percent Mg, from about 0.1 to about 0.5 weight percent Ag, from about 0.05 to about 0.5 weight percent grain refiner selected from the group consisting of Zr, Cr, Mn, Ti, Hf, V, Nb, B, $TiB_2$, and mixtures thereof, and the balance aluminum and incidental impurities, which in the T4 temper possesses a yield strength in the range of from about 55 to about 77 ksi, an ultimate tensile strength in the range of from about 67 to about 100 ksi, and an elongation in the range of from about 8 to about 25 percent.

68. A non-cold worked, artificially aged aluminum-base alloy consisting essentially of from about 4.0 to about 5.5 weight percent Cu, from about 0.9 to about 1.6 weight percent Li, from about 0.5 to about 1 weight percent Zn, from about 0.2 to about 0.5 weight percent Mg, from about 0.1 to about 0.5 weight percent Ag, from about 0.05 to about 0.5 weight percent grain refiner selected from the group consisting of Zr, Cr, Mn, Ti, Hf, V, Nb, B, $TiB_2$, and mixtures thereof, and the balance aluminum and incidental impurities, which in the T6 temper possesses a yield strength in the range of from about 70 to about 110 ksi, an ultimate tensile strength in the range of from about 80 to about 118 ksi, and an elongation in the range of from about 1 to about 10 percent.

69. A cold worked, artificially aged aluminum-base alloy consisting essentially of from about 4.0 to about 5.5 weight percent Cu, from about 0.9 to about 1.6 weight percent Li, from about 0.5 to about 1 weight percent Zn, from about 0.2 to about 0.5 weight percent Mg, from about 0.1 to about 0.5 weight percent Ag, from about 0.05 to about 0.5 weight percent grain refiner selected from the group consisting of Zr, Cr, Mn, Ti, Hf, V, Nb, B, $TiB_2$, and mixtures thereof, and the balance aluminum and incidental impurities, which in the T8 temper possesses a yield strength in the range of from about 70 to about 110 ksi, an ultimate tensile strength in the range of from about 80 to about 118 ksi, and an elongation in the range of from about 2 to about 15 percent.

70. A welding filler alloy for welding aluminum-base alloys, the welding alloy consisting essentially of from about 4.0 to about 6.5 weight percent Cu, from about 0.5 to about 2.6 weight percent Li, from about 0.5 to about 2 weight percent Zn, from about 0.05 to about 0.8 weight percent Mg, from about 0.1 to about 1 weight percent Ag, from about 0.01 to about 2 weight percent grain refiner selected from the group consisting of Zr, Cr, Mn, Ti, Hf, V, Nb, B, $TiB_2$ and combinations thereof, and the balance aluminum and incidental impurities.

71. A welding filler alloy according to claim 70, wherein the Cu comprises from about 4.5 to about 6 weight percent, the Li comprises from about 0.8 to about 1.6 weight percent, the Zn comprises from about 0.5 to about 0.75 weight percent, the Mg comprises from about 0.2 to about 0.5 weight percent, the Ag comprises from about 0.1 to about 0.4 weight percent, and the grain refiner comprises from about 0.05 to about 0.5 weight percent.

72. A welding filler alloy according to claim 70, wherein the grain refiner comprises Zr.

73. A welding filler alloy according to claim 70, wherein the alloy further consists of from about 0.01 to about 1.5 weight percent of an element selected from the group consisting of Ge, Sn, Cd, In, Be, Sr, Sc, Y, Ca, and combinations thereof.

74. An aluminum-base alloy consisting essentially of from about 3.0 to about 6.5 weight percent Cu, from about 0.5 to about 2.6 weight percent Li, from about 0.5 to about 2 weight percent Zn, from about 0.1 to about 1.5 weight percent Mg, from about 0.05 to about 1 weight percent Ag, from about 0.01 to about 2 weight percent grain refiner selected from the group consisting of Zr, Cr, Mn, Ti, Hf, V, Nb, B, $TiB_2$ and combinations thereof, and the balance aluminum and incidental impurities, wherein the weight percent ratio of Cu to Li is greater than about 2.5.

75. An alloy according to claim 74, wherein the Li comprises from about 0.8 to about 2.0 weight percent and the weight percent ratio of Cu to Li is greater than about 3.

76. An aluminum-base alloy consisting essentially of about 4.75 weight percent Cu, about 1.3 weight percent Li, from about 0.5 to about 2.0 weight percent Zn, about 0.4 weight percent Mg, about 0.4 weight percent Ag, about 0.14 weight percent Zr, and the balance aluminum and incidental impurities.

77. An alloy according to claim 76, wherein the Zn comprises about 0.5 weight percent.

78. An alloy according to claim 76, wherein the Zn comprises about 0.75 weight percent.

79. An alloy according to claim 76, wherein the Zn comprises about 1.0 weight percent.

80. An alloy according to claim 76, wherein the Zn comprises about 1.5 weight percent.

81. An alloy according to claim 76, wherein the Zn comprises about 2.0 weight percent.

* * * * *

UNITED STATES PATENT AND TRADEMARK OFFICE
CERTIFICATE OF CORRECTION

PATENT NO.   : 5,211,910
DATED        : May 18, 1993
INVENTOR(S)  : Joseph R. Pickens et al.

It is certified that error appears in the above-identified patent and that said Letters Patent is as shown below:

Column 2, line 29, after "8" insert --to 1--.

Column 5, line 29, change "to" (second occurrence) to --and--.

Column 18, line 62, after "aluminum" insert --.--.

Column 20, claim 6, line 44, after "from about" (first occurrence) insert --1--.

Column 21, claim 37, line 62, change "0.25" to --0.5--, and change "0.5" to --.75--.

Signed and Sealed this

Twenty-sixth Day of July, 1994

Attest:

BRUCE LEHMAN

*Attesting Officer*     *Commissioner of Patents and Trademarks*